(12) United States Patent
Banka et al.

(10) Patent No.: US 7,003,481 B2
(45) Date of Patent: Feb. 21, 2006

(54) METHOD AND APPARATUS FOR PROVIDING NETWORK DEPENDENT APPLICATION SERVICES

(75) Inventors: Peter S. Banka, Portland, OR (US); Sam A. Silverberg, Portland, OR (US)

(73) Assignee: Flatrock II, Inc., Portland, OR (US)

( * ) Notice: Subject to any disclaimer, the term of this patent is extended or adjusted under 35 U.S.C. 154(b) by 743 days.

(21) Appl. No.: 09/870,959

(22) Filed: May 30, 2001

(65) Prior Publication Data

US 2002/0198840 A1    Dec. 26, 2002

Related U.S. Application Data

(60) Provisional application No. 60/228,128, filed on Aug. 25, 2000.

(51) Int. Cl.
  *G06F 17/60* (2006.01)
(52) U.S. Cl. .......................... 705/26; 709/223
(58) Field of Classification Search .............. 705/26, 705/64, 75, 80; 709/200–253, 400; 718/1, 718/100–108; 713/152–153; 707/10; 380/233; 379/204, 399; 398/70–71, 100; 455/3
See application file for complete search history.

(56) References Cited

U.S. PATENT DOCUMENTS

| | | | |
|---|---|---|---|
| 5,774,668 A | | 6/1998 | Choquier et al. |
| 5,862,328 A | | 1/1999 | Colyer |
| 5,903,882 A | * | 5/1999 | Asay et al. ................... 705/44 |
| 5,953,229 A | | 9/1999 | Clark et al. |
| 6,055,236 A | | 4/2000 | Nessett et al. |
| 6,141,339 A | * | 10/2000 | Kaplan et al. ......... 370/395.61 |
| 6,480,506 B1 | * | 11/2002 | Gubbi ........................ 370/468 |
| 6,584,454 B1 | * | 6/2003 | Hummel et al. .............. 705/59 |
| 6,584,567 B1 | * | 6/2003 | Bellwood et al. ........... 713/171 |
| 6,707,796 B1 | * | 3/2004 | Li .............................. 370/254 |

FOREIGN PATENT DOCUMENTS

| | | |
|---|---|---|
| EP | 1160691 A2 * | 12/2001 |
| GB | 2 365 256 A | 2/2002 |
| WO | WO 99/22332 | 5/1999 |

OTHER PUBLICATIONS

O'Keefe, "Foreign ISPs Look to the Skies for Internet Access", Mar. 1999, Telecommunications (Americas Edition) v33n3, p 65, ISSN: 0278-4831.*

"Program for Exporting Transmission Control Protocol-Based Services through Firewalls," IBM Technical Disclosure Bulletin, IBM Corp., New York, US, vol. 40, No. 12, Dec. 1, 1997, pp. 161-162.

Ingham et al., "HPL-1999-50—CORBA Transactions Through Firewalls," Hewlett Packard Technical Report, Online! URL:http://www.hpl.hp.com/techreports/1999/HPL-1999-50.html, retrieved on Jul. 1, 2002!.

(Continued)

*Primary Examiner*—Mary D. Cheung
(74) *Attorney, Agent, or Firm*—Perkins Coie LLP

(57) ABSTRACT

A method and apparatus for providing network dependent application services is provided. In accordance with one embodiment of the invention, a first group of one or more application service contracts specifying subscriptions to one or more application services are provided to a community of one or more subscriber application routers (SAR) by a first application service Provider. One or more application delivery transports are then automatically provisioned in accordance with the one or more application service contracts, and selected ones of the application services are delivered through selected ones of said application delivery transports.

34 Claims, 11 Drawing Sheets

OTHER PUBLICATIONS

NORIFUSA, "Internet security: difficulties and solutions," International Journal of Medical Informatics, Elsevier Scientific Publishers, Shannon, IR, vol. 49, No. 1, Mar. 1998, pp. 69-74.

Schreiner, "CORBA Firewalls," ObjectSecurity Whitepaper, Online! Aug. 15, 1999, URL:http://www.objectsecurity.com/whitepapers/corba/fw/main/html, retrieved on Jul. 1, 2002!.

Srisuresh et al., "RFC 2663—IP Network Address Translator (NAT) Terminology and Considerations," Request for Comments, Online! URL:http://www.ietf.org/rfc/rfc2663.txt, retrieved on Jul. 1, 2002!.

Srisuresh et al., "RFC 2709—Security Model with Tunnel-mode IPsec for NAT Domains," Request for Comments, Online! URL:http://www.ietf.org/rfc/rfc2709.txt, retrieved on Jul. 1, 2002!.

Iona Technologies: "OrbixNames Programmer's and Administrator's Guide", Iona Technologies Manuals, Jun. 1999, XP002178411, p. 37-p. 48.

Microsoft Corporation: "DCOM Technical Overview", Microsoft Corporation Documentation, Nov. 1996, XP002178408, Security Load Balancing.

Garfinkel Simson; Spafford Gene: "Web Security And Commerce", Jun. 1997, O'Reilly XP002196011, p. 99-p. 131.

Yang Z et. al.: "COBRA: A Platform For Distributed Object Computing" Operating Systems Review (SIGOPS), ACM Headquarter. New York, US, vol. 30, No. 2, Apr. 1, 1996, pp. 4-31, XP000585086, 2 Overview of OMG OMA, 3.9 Logacy Systems, Figure 5.

* cited by examiner

METHOD AND APPARATUS FOR PROVIDING NETWORK DEPENDENT APPLICATION SERVICES

RELATED APPLICATIONS

This application is a non-provisional application of the earlier filed provisional application No. 60/228,128, filed on Aug. 25, 2000, and claims priority to the earlier filed '128 provisional application, whose specification is hereby fully incorporated by reference.

BACKGROUND OF THE INVENTION

1. Field of the Invention

The present invention relates to the field of computer networking. More specifically, the present invention relates to a method and apparatus for subscribing, authenticating, and provisioning network-based applications and services.

2. Background Information

With Internet usage becoming near ubiquitous, an ever-increasing number of software application providers and users are turning to the Internet for delivery of that software. Software vendors are migrating to an application service provider (ASP) model of software delivery, and corporate IT is beginning to look upon itself as an ASP, as a Provider to its own end user customers. The application service provider delivery model involves providing a set of one or more computer software applications or services through one or more network connections to a Subscriber, which obtains the application services from the Provider for the benefit of its end users.

In the past, the process of delivering applications from a Provider to a Subscriber (e.g. from an ASP to a Corporate Subscriber, or from Corporate IT to its end users) has been a manual, labor-intensive process as each Subscriber network or end user client was required to be manually configured in order to access each Provider network and Provider application. To accomplish this, Subscribers and Providers were often forced to undergo lengthy planning and design sessions, gathering information from Network/Internet service providers and application vendors for network and system integration.

Similarly in the past, Subscriber End User authentication has been performed on an application by application basis each time a user attempted to access an application hosted by the Provider. This required that the Subscriber notify the Provider and have the Provider update its authentication databases every time the Subscriber required user access privileges to be changed. FIG. 1 illustrates a prior art Provider-Subscriber relationship whereby a Subscriber is connected (e.g., through Internet 105) to two Providers (Provider 1 & Provider 2) each hosting multiple applications. In the past, network integration between Providers and Subscribers has been prohibitively difficult, because of security policies enforced by firewalls and because of local network addressing requirements. To overcome these issues of connectivity, Providers and Subscribers have been forced to do one of two things: (1) pay for non-Internet Wide-Area-Network access through frame Relay, ATM, or private leased lines, or (2) go through the very expensive and time consuming process of installing a VPN solution. Each of these approaches are an expensive means of connecting the two organizations, and they do nothing to address the provisioning, authentication, allocation, and monitoring of the application to be delivered.

In the past it has been necessary for Subscriber End Users to be authenticated by the Provider prior to being granted access to the Provider's applications. For example, prior to being granted access to application "A", Subscriber End Users at clients 102–103 would be required to be authenticated via authentication database 107. To do so, clients 102–103 would transmit their user ID and password to Provider 1 where a comparison would be made against entries found in authentication database 107. Likewise, in order to access application "B", clients 102–103 would be required to be authenticated by way of authentication database 109, for example. Even in situations (as with Provider 2) where a single shared authentication database such as database 112 is utilized to authenticate Subscriber End Users for access to multiple Provider applications, the fact remains that the Provider maintains a complete set of user names, passwords, and group membership data independently of the Subscriber, thereby imposing significant administration requirements on the parts of both the Provider and the Subscriber, and forcing the Subscriber to give up control of sensitive information.

Therefore, what is needed is a scalable Subscriber-Provider model that overcomes the limitations of the prior art.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as data, tables, requesting, determining, retrieving, displaying, accessing, transmitting, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
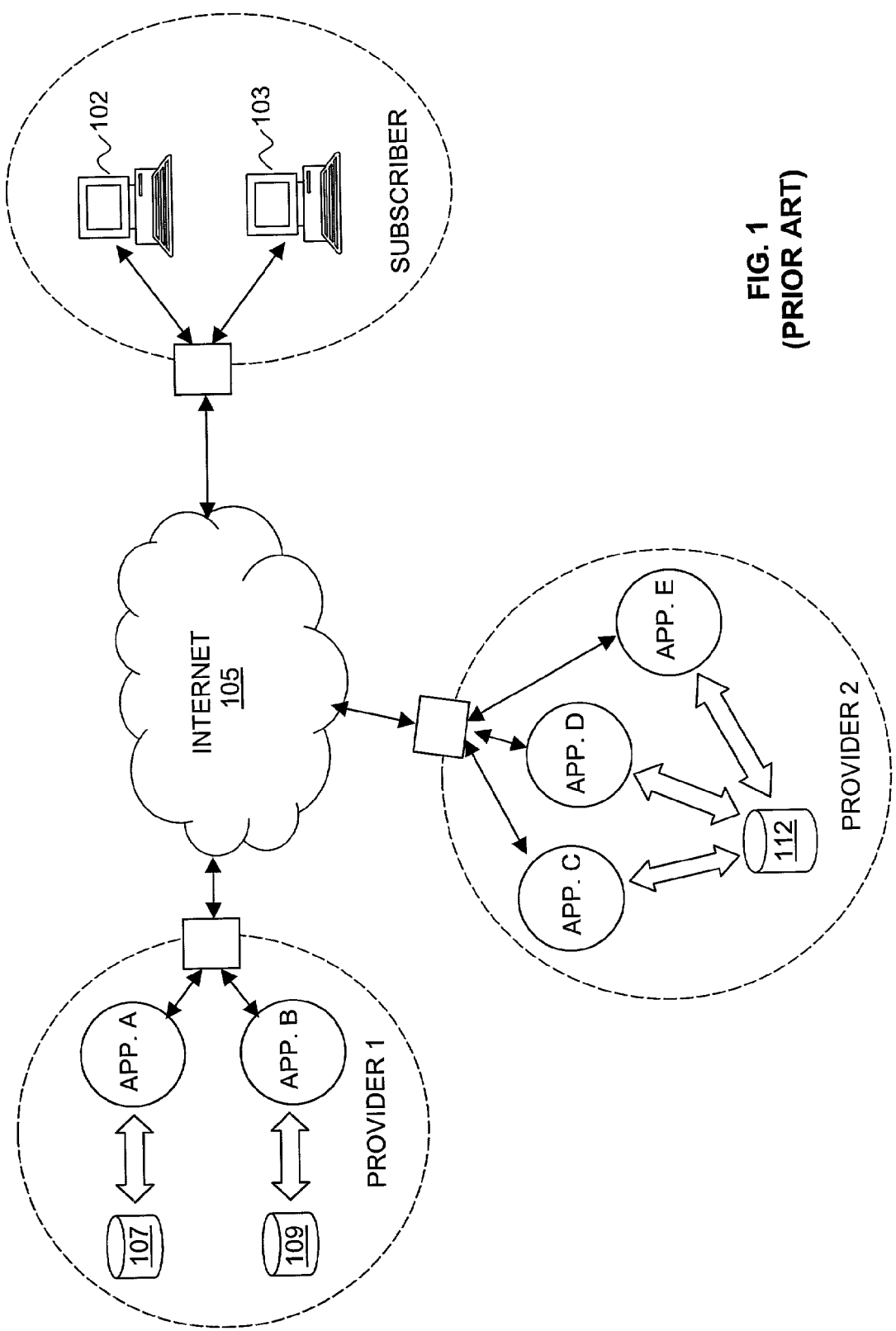
FIG. 1 is a block diagram illustrating a Provider-Subscriber relationship according to the prior art.
Figure 2:
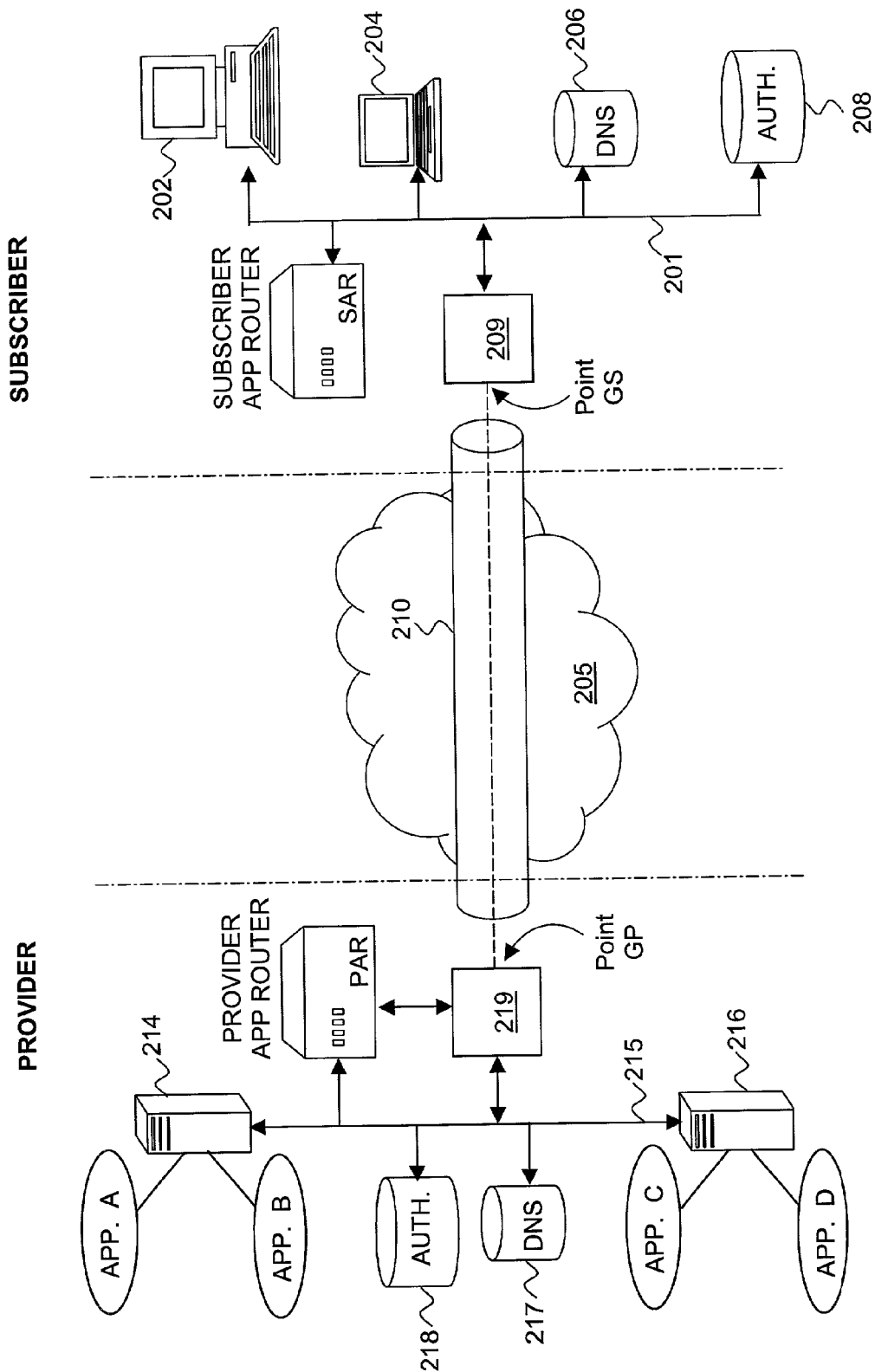
FIG. 2 is a block diagram illustrating various aspects of an application delivery network of the present invention.

FIG. 2 is a block diagram illustrating various aspects of an application delivery network of the present invention. In FIG. 2, a Subscriber Application Router (SAR) and a Provider Application Router (PAR), both incorporated with the teachings of the present invention, are shown. The SAR is coupled to Subscriber network 201, which interconnects client 202, client 204, optional domain name service (DNS) 206, and optional authentication authority 208. The PAR on the other hand is coupled to provider network 215, which interconnects application server 214 hosting applications A and B, and application server 216 hosting applications C and D.

Subscriber network 201 is communicatively coupled to Provider network 215 via Subscriber firewall 209, networking fabric 205, and Provider firewall 219. Networking fabric 205 represents one or more interconnected data networks such as, but not limited to, the Internet, whereas Subscriber network 201 and Provider network 215 each represent a network such as a local area network (LAN), campus network, or a multi-site WAN. In one embodiment, each site or campus is constrained to only one low-bandwidth WAN connection to an interconnected data network. Subscriber firewall 209 and Provider firewall 219 represent conventional routing devices designed to filter and route datagrams between local network domains and global network domains, as well as to conceal address information of the Subscriber or Provider network, as the case may be. For example, Subscriber firewall 209 routes datagrams between Subscriber network 201 and networking fabric 205, while optionally concealing the addresses of clients 204 and 205 from networking fabric 205. Similarly, Provider firewall 219 routes datagrams between provider network 215 and networking fabric 205 while optionally concealing the addresses of servers 214 and 216 from networking fabric 205.

In one embodiment, the SAR and the PAR are communicatively coupled through networking fabric 205 via transport 210. Transport 210 represents a virtual data path between globally addressable point GS of the Subscriber network and globally addressable point GP of the Provider network. In one embodiment, transport 210 represents a virtual private network ("VPN") comprising one or more tunnels provisioned between the Subscriber and the Provider to communicatively couple one or more SARs with one or more PARs.

In accordance with the teachings of the present invention, client 202 and/or client 204 access one or more applications from one or more Provider presentation servers (e.g. 214 and 216) via transport 210 in cooperation with the SAR and the PAR. In accordance with one embodiment of the invention, Subscriber authentication authority 208 authorizes client 202 and/or client 204 prior to client 202 and/or client 204 accessing the Provider's application. That is, client 202 and/or client 204 can access the Provider's applications without the need for the Provider to necessarily maintain its own authentication database for each application.

In accordance with the teachings of the present invention, at least one of the PAR and the SAR is equipped with contract creation services (Provisioning), user authentication and authorization services (Allocation), and contract acceptance and connectivity establishment services (Fulfillment). Provisioning facilitates the creation of electronic service contracts (i.e. Agreements) between Subscribers and Providers. In one embodiment, each service contract represents a presentation method for a given application. In one embodiment contracts are implemented using a markup language, or an abstract syntax notation such as XML.

The Fulfillment services of the present invention facilitate automatic and transparent creation of one or more transports between the Subscriber network and the Provider network. In one embodiment, the establishment of the one or more transports is based at least in part upon terms of service agreed upon between the Subscriber and the Provider embodied in the form of one or more electronic service contracts. The Fulfillment services further operate to solicit and exchange, and maintain a history of operating characteristics, including bandwidth and quality of service (QOS) metrics pertaining to network connections between the Subscriber and the Provider, amongst a community of application routing devices disposed within the Provider and/or Subscriber networks. In one embodiment, a preferred network connection and corresponding application router is selected based upon the solicited operating characteristics to provide application services.

In one embodiment, the Fulfillment services of the present invention provide automatic and transparent datagram delivery between networks having diverse addressing requirements, including addresses spanning public and private (i.e. RFC 1918 or reserved RFC 1166 based) address spaces. In one embodiment, the fulfillment services include address translation and encapsulation services to translate local source and destination address pairs into virtual non-routable source and destination address pairs, which are then each encapsulated within a container packet and transmitted to a second network via a pre-provisioned transport. Once received at the second network, the container packets are "unpackaged" to reveal the embedded virtual non-routable source and destination address pairs, which are further translated into a new source and destination address pair for delivery to the ultimate recipient while still implicitly identifying the original source. In one embodiment, a SAR transmits a container packet to a PAR identifying a subscriber client as the original source while identifying a Provider server as the ultimate recipient.

PAR Configuration

Before a PAR is placed in communication with one or more SARs, the PAR is configured by e.g. a Provider administrator. More specifically, the PAR is provided with an appropriate subnet mask, default gateway and appropriate routing information (e.g. depending upon router/firewall presence or absence) as well as the network address of an external DNS server. In one embodiment, the Provider's own DNS server is configured to reference the PAR as a child domain for all application naming for which the Provider is authoritative (e.g. apps.provider.com).

Each additional PAR that is added to the Provider domain and/or application delivery zone is likewise configured before becoming fully operational. In one embodiment, one or more PARs are designated as a "PAR Bridgehead." The PAR bridgehead accepts unsolicited connections from the Internet from new SARs that come online. The PAR Bridgehead verifies the authenticity of SARs and is responsible for making the SARs aware of any and all contracts that are available for Fulfillment. Moreover, the PAR Bridgehead functions as a "front door" to the Provider thereby reducing e.g. the negative impact of a Denial of Services attack from the Internet.

SAR Configuration

As with PARs, SARs also involve minor initial configuration prior to becoming fully operational. To begin, an agent of the Subscriber provides the SAR with its own IP address information (e.g. the authorization to use a DHCP server or a combination of IP address, subnet mask, default gateway). Optionally, the SAR can be configured with network routing information that allows the SAR to communicate to clients throughout the Subscriber's Internetwork. Next, the SAR is provided with the IP address or network name of a PAR Bridgehead. In one embodiment, the SAR is provided with a one-time password for initial communication with the PAR Bridgehead. Accordingly, the SAR performs an initial connection with the PAR Bridgehead using the provided one-time password to encrypt the traffic between the devices. Once communication is established with the PAR Bridgehead, public encryption keys are then exchanged between the Subscriber and Provider.

Provisioning

In accordance with one aspect of the invention, a Subscriber enters into an electronic service Contract ("Contract") with a Provider to access (perhaps through lease or purchase) one or more applications and/or services hosted by the Provider. Each Contract between the Subscriber and the Provider (e.g. by way of one or more PARs) represents a particular presentation method for an application to be accessed by the Subscriber. That is, each Contract essentially represents a roadmap for providing a particular presentation service (e.g. application) to a subscriber, and may contain such items as payment terms, the number and nature of remote applications to be made accessible to the Subscriber, the number of licenses to be granted for each remote application, the number of virtual private network connections and/or tunnels to be provisioned between the Subscriber and the Provider, network security requirements of the application, client binary file distribution location and platform information, the bandwidth to be reserved for use by the Subscriber in accessing the remote applications, preferred performance and Quality of Service (QOS) levels, and so forth.

In one embodiment, termed an "Active Subscriber model," an agent of the Subscriber solicits an offer for service, including e.g. such terms as described above, from a Provider. In response, the Provider generates an electronic service Contract incorporating all, none, or only a portion of the terms solicited by the agent of the Subscriber. Once generated, the electronic service contract is transmitted by a PAR to a SAR for subsequent approval by an agent of the Subscriber. In one embodiment, the electronic service contract stipulating such terms as described above is transmitted between PARs and SARs using an encrypted control channel. Once received, the Contract is reviewed and accepted by a designated agent of the Subscriber. The designated agent may be the agent of the Subscriber who originally solicited the offer, however, this need not be the case. For example, individuals such as a network administrator or groups of individuals such as a management committee responsible for purchasing may be designated as agents of the Subscriber for the purposes of the electronic service Contract.

In an alternative embodiment, the Subscriber is assumed to be "passive," allowing the Provider to stipulate the terms and conditions of the service Agreement autonomously. In such a "Passive Subscriber" embodiment, the SAR automatically approves the electronic service Contract without interaction from an agent of the Subscriber.

Figure 3A:
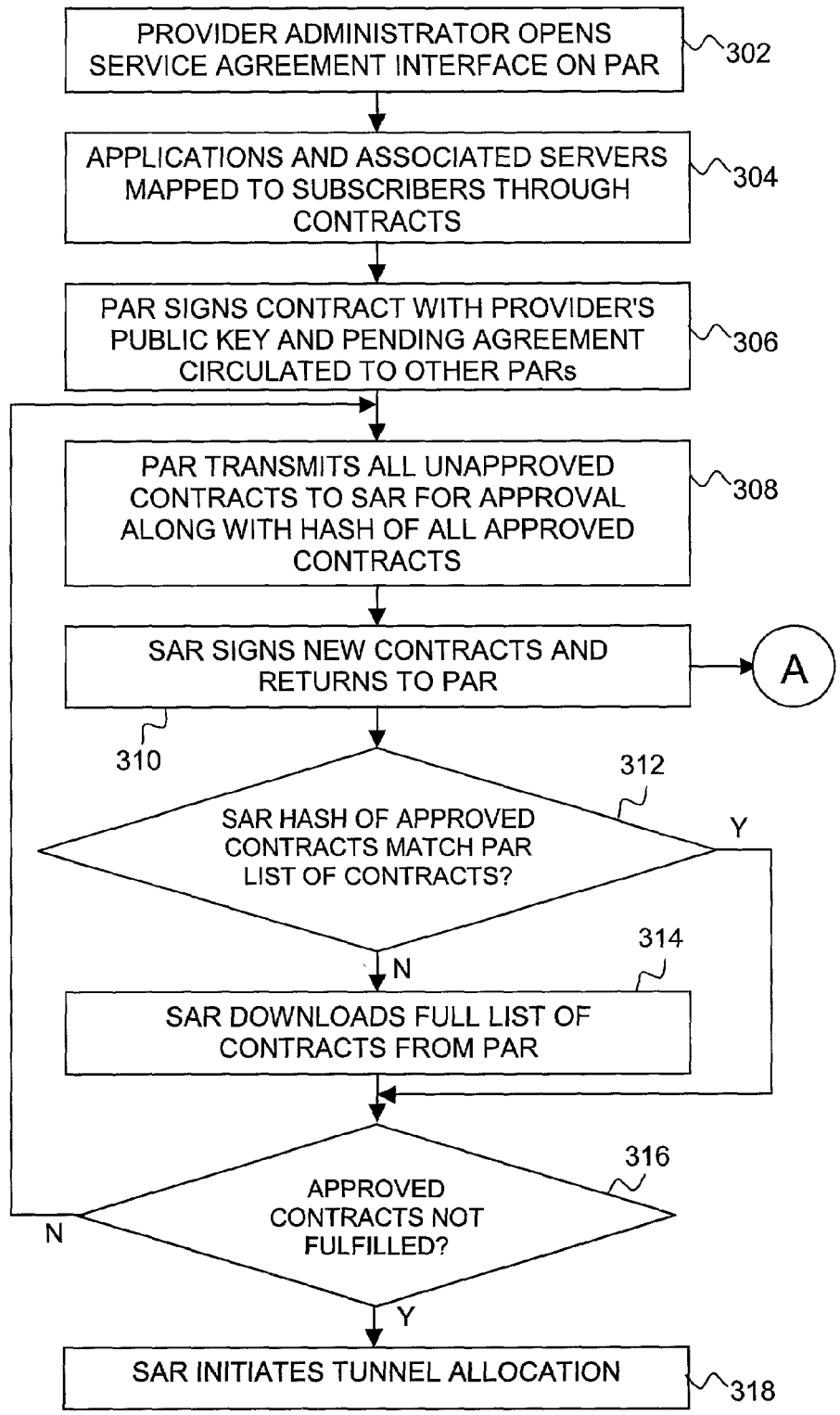
FIGS. 3A and 3B together illustrate an operational flow diagram of various aspects of the contract creation process, in accordance with a passive Subscriber embodiment of the invention.
Figure 3B:
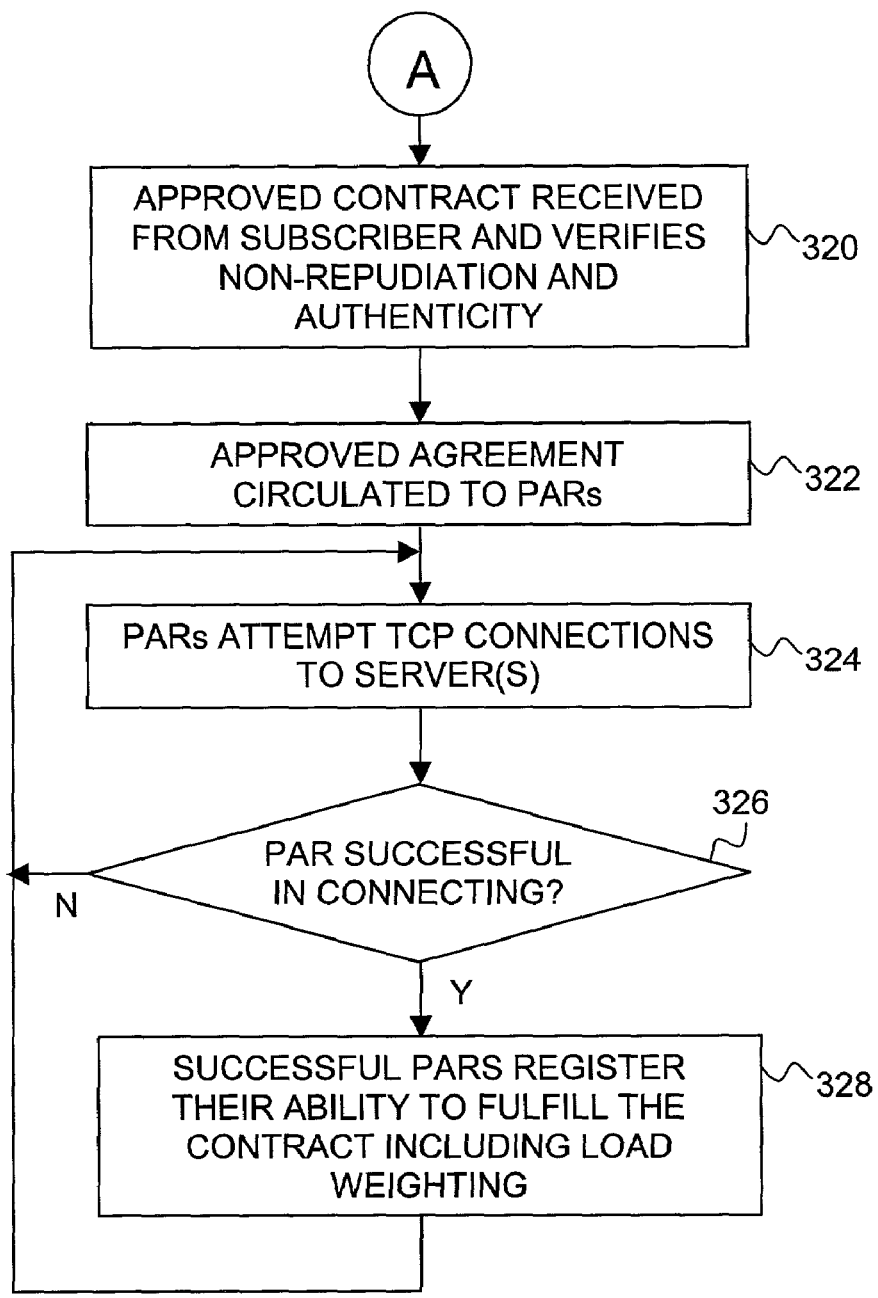

FIGS. 3A and 3B together illustrate an operational flow diagram of various aspects of the contract creation process, in accordance with a passive Subscriber embodiment of the invention. At block 302, an individual such as a Provider IT Administrator opens a user interface to a PAR (see e.g. FIG. 4) in order to establish one or more Contracts for delivery to the Subscriber. Through the interface, the Provider selects applications to be provided to the Subscriber as well as corresponding presentation servers to provide the applications. The applications and corresponding presentation servers are then associated with the Contract at block 304. In one embodiment, the hostname of each participating presentation server is mapped to a contract ID for a particular application. Once created, the Contract is digitally signed by the PAR using the Provider's public key, and propagated to the remaining PARs (if any) at the Provider site, block 306.

The new Contract, and any other unapproved Contracts are then transmitted to the Subscriber for approval, along with a hash value representing all approved contracts that the PAR is aware of, block 308. In the passive Subscriber embodiment, the SAR automatically approves any unapproved contracts, whereas in an active Subscriber embodiment, an Agent of the Subscriber may choose to either approve or decline the contracts based upon e.g. the terms of the Contracts. In one embodiment, the Subscriber's approval of the new Contract is established when a SAR has signed the Contract with its private key and has retransmitted the new Contract to the PAR Bridgehead. For the purposes of this description, it is assumed that the Subscriber has approved the Contracts and returned them back to the Provider, block 310. At this point, the PAR and the SAR each continue with the Fulfillment process independently from one another. The remainder of FIG. 3A describes the SAR process for determining whether it is aware if all contracts yet to be fulfilled, whereas FIG. 3B describes the Fulfillment process from the perspective of the PAR.

Continuing at block 312, the SAR determines whether the hash value received from the PAR (representing the list of approved contracts recognized by the PAR), matches a SAR hash value representing the approved contracts recognized by the SAR. If the respective hash values of the PAR and SAR indicate an approved contract status that differs from one another, the SAR downloads a complete list of approved contracts from the PAR, block 314. Finally, the SAR determines if there are any approved contracts that remain to be fulfilled, block 316, and if so, the SAR initiates Fulfillment (as described e.g. in FIG. 5) for those Contracts, block 318. However, if there are no unfulfilled Contracts, the SAR again waits for new unapproved contract(s) from the Provider, block 308.

From the perspective of the PAR, once the SAR has returned the signed contracts to the PAR at block 310 of FIG. 3A, the PAR verifies that the contract has not been tampered with and that the SAR has not rejected the agreement, block 320 of FIG. 3B. The approved Contract is then circulated amongst all PARs, block 322. In one embodiment, each PAR, then attempts to connect to a predefined socket of a stipulated presentation server using a TCP port as indicated by the contract, block 324.

If a PAR is successful in connecting to the presentation server (block 326), the successful PAR registers itself with its PAR peers in a manner that indicates such, block 328. In one embodiment, this registration is done through DNS, where such a DNS entry may take on the following form: contractID.apps.provider.com, where "contractID" is an identifier (alphanumerical or otherwise) that identifies the particular contract corresponding to the successful PAR service port connection to the Provider, and "apps.provider.com" represents the domain of the Provider network, or an application delivery zone within the domain. In one embodiment, a weight value is determined based upon the successful PAR's current processing and/or communication load. This weight value is used in load balancing and is made available to the PAR's peers. In one embodiment the weight value is stored in association with the DNS entry.

Figure 4:
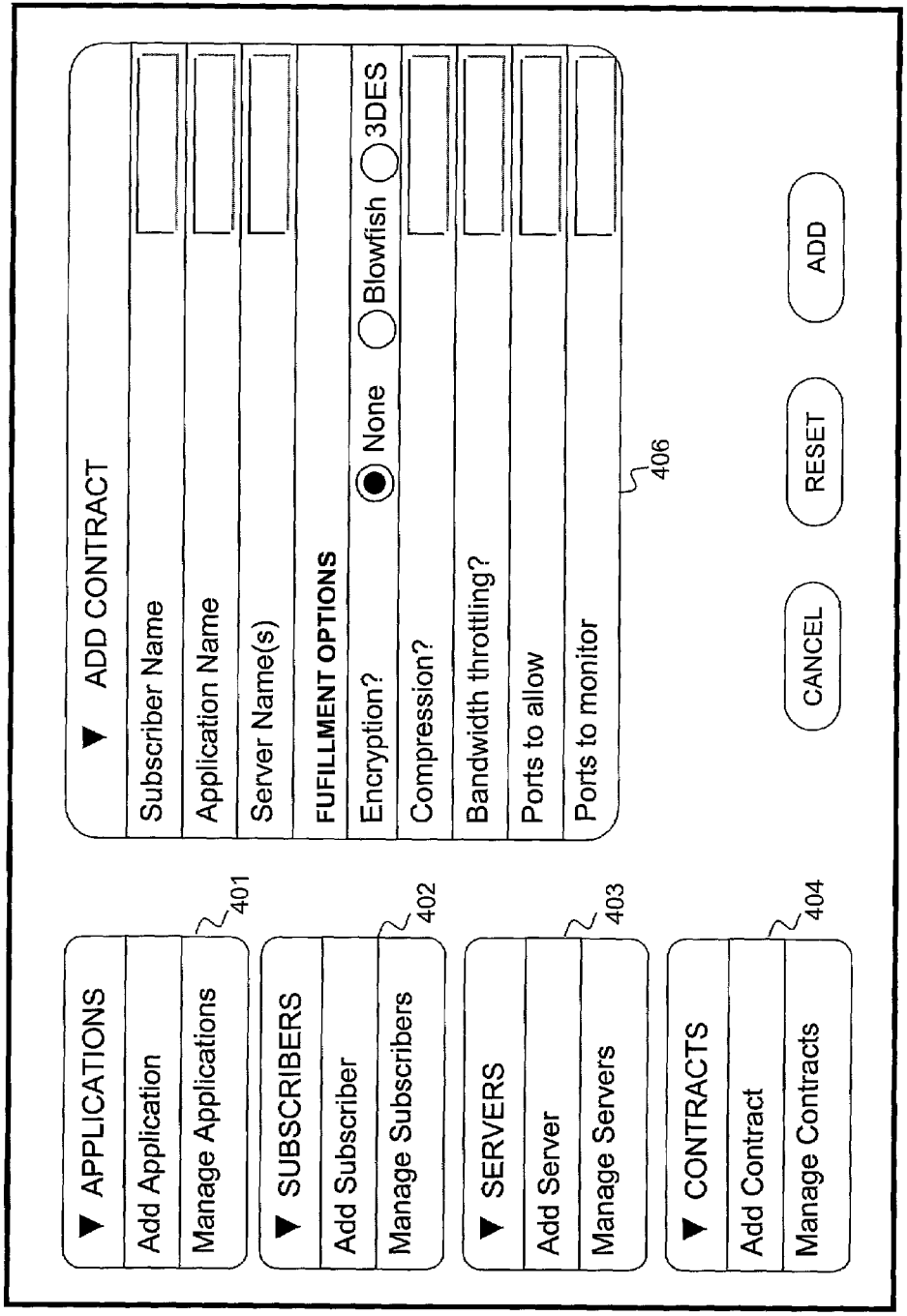
FIG. 4 illustrates an exemplary administrative interface for managing service Agreements at a PAR, in accordance with one embodiment of the invention.

FIG. 4 illustrates an exemplary administrative interface for managing service Agreements at a PAR, in accordance with one embodiment of the invention. The administrative interface depicted in FIG. 4 includes application management controls 401, Subscriber Management controls 402, Server management controls 403, Contract Management controls 404, and an Add Contract dialog 406.

Application Management controls (401) provide the facility to describe the Provider's applications to the PARs. The information that may be entered here includes, for example, the name of the application, the default transport options, the icon that will appear on the Subscriber End User's desktop, and so forth.

Subscriber Management controls (402) provide the facility to describe the Subscribers that will be utilizing services from the Provider, while Server Management controls (403) provide the facility for maintaining the servers that will eventually service requests from the Subscriber.

Contract Management controls (404) provide the ability to create, edit, view, and delete contracts, whereas the Add Contract dialog (406) is the actual interface for creation of service Contracts. As shown, Add Contract dialog 406 provides for the synthesis of three pieces of data for the creation of a Contract: Subscriber, Application, and Server. Details of fulfillment (e.g. Encryption, Compression, Throttling, Monitored ports, Firewalled ports) can then be specified in the Contract.

It should be noted that the items depicted in FIG. 4 are merely intended to be illustrative and should not be read as limiting the invention. Furthermore, in an active Subscriber model, the service Agreement may be electronically solicited from the Provider by the Subscriber rather than the Provider autonomously initiating the Agreement.

Contract Fulfillment

Par Selection

Figure 5:
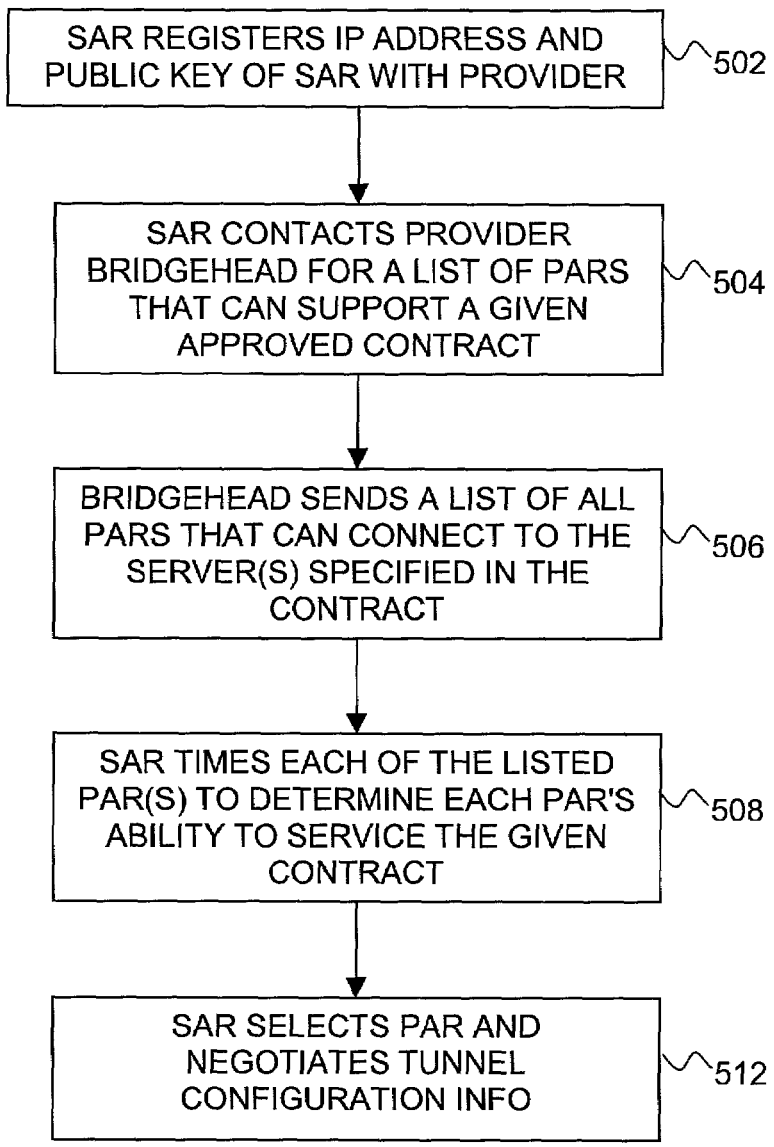
FIG. 5 is an operational flow diagram illustrating relevant aspects of the contract fulfillment process of the present invention, in accordance with one embodiment.

If a SAR identifies a contract that remains to be fulfilled (i.e. that does not have an active transport and is not yet available to clients), the SAR initiates a Contract Fulfillment process (e.g. block 318 of FIG. 3A). FIG. 5 is an operational flow diagram illustrating relevant aspects of the Contract Fulfillment process in accordance with one embodiment of the invention. To begin, if it hasn't already done so, the SAR registers its own IP address and public key with the Provider, block 502. Using the Provider's public key, the SAR establishes an encrypted administrative channel with the PAR Bridgehead, and requests a list of PARs that have been identified as being able to support a given approved contract (i.e. able to connect via TCP to the presentation server(s) specified in the contract), block 504. In response, the PAR Bridgehead returns such a list to the SAR, block 506.

The SAR then probes PARs appearing in the list received from the Bridgehead to determine timing and performance metrics to ascertain each PAR's ability to service a particular Contract, block 508. In one embodiment of the invention, the SAR selects the PAR that proves to be the fastest. Through such an exchange, the SAR is able to achieve load balancing among multiple PARs at the Provider site, which assists in evening out the flow of datagrams transmitted over each tunnel thereby improving performance and availability.

Once a preferred PAR is identified (e.g. based upon the various timing and performance metrics), the SAR and preferred PAR negotiate a port, tunnel parameters, and a shared secret for a tunnel to be established, block 512. Additionally, the SAR and the PAR negotiate the addressing within the tunnel (see Transport Services below).

Transport Services

Figure 7:
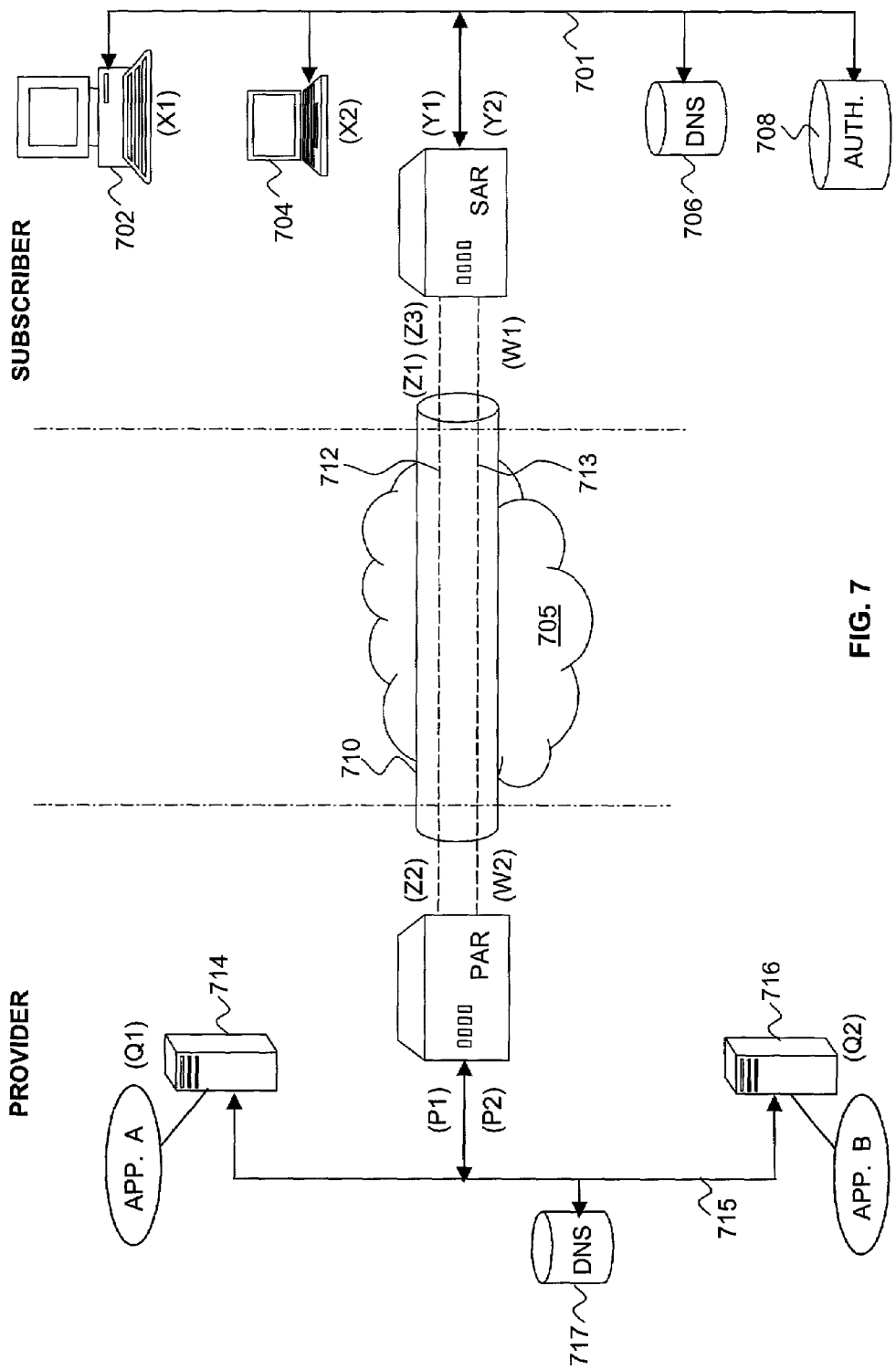
FIG. 7, is a block diagram illustrating a logical view of the application delivery network as it applies to one embodiment of the network address translation and encapsulation services of the present invention.

Due to the blend of private and public addressing schemes that are typically encountered by a Subscriber and Provider while attempting to establish connectivity to each other, the present invention includes network address translation and encapsulation ("Transport") services to facilitate transparent access by a client to an application and/or service hosted by a Provider. FIG. 7, is a block diagram illustrating a logical view of an application delivery network as it applies to one embodiment of the Transport services of the present invention. Similarly, FIGS. 8A and 8B are block diagrams graphically illustrating an operational flow of relevant aspects of the Transport services of the present invention.

Reference is now made to FIG. 7, where the application delivery network shown is similar in form to that illustrated in FIG. 2. However, for the sake of clarity, the Subscriber and Provider firewalls have been omitted, and a logical tunnel network (710) has been shown. In the application delivery network of FIG. 7, a Subscriber Application Router (SAR) and a Provider Application Router (PAR) both incorporated with the teachings of the present invention are shown. Subscriber network 701 interconnects the SAR with client 702, client 704, (optional) domain name service 706 and (optional) authentication authority 708. Provider network 715 interconnects the PAR with application server 714 hosting application "A", and application server 716 hosting application "B". In accordance with the teachings of the present invention, a client (e.g. client 702) of Subscriber network 701 accesses an application and/or service presented by Provider network 715 via one or more pre-provisioned transports between the SAR and the PAR, independent of each network's respective addressing scheme.

Figure 8A:
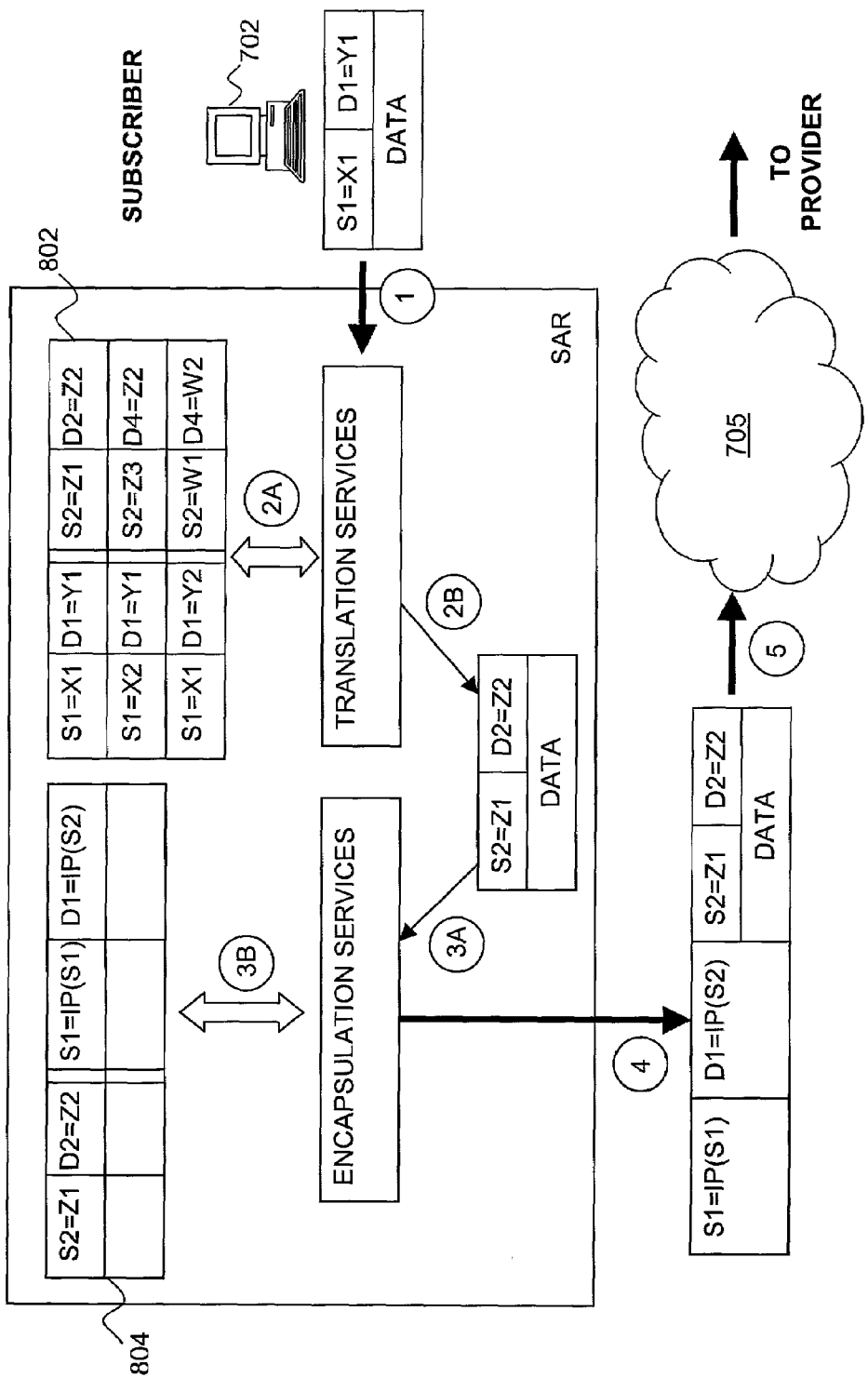
FIGS. 8A and 8B together graphically illustrate an operational flow of relevant aspects of the translation and encapsulation services of the present invention.
Figure 8B:
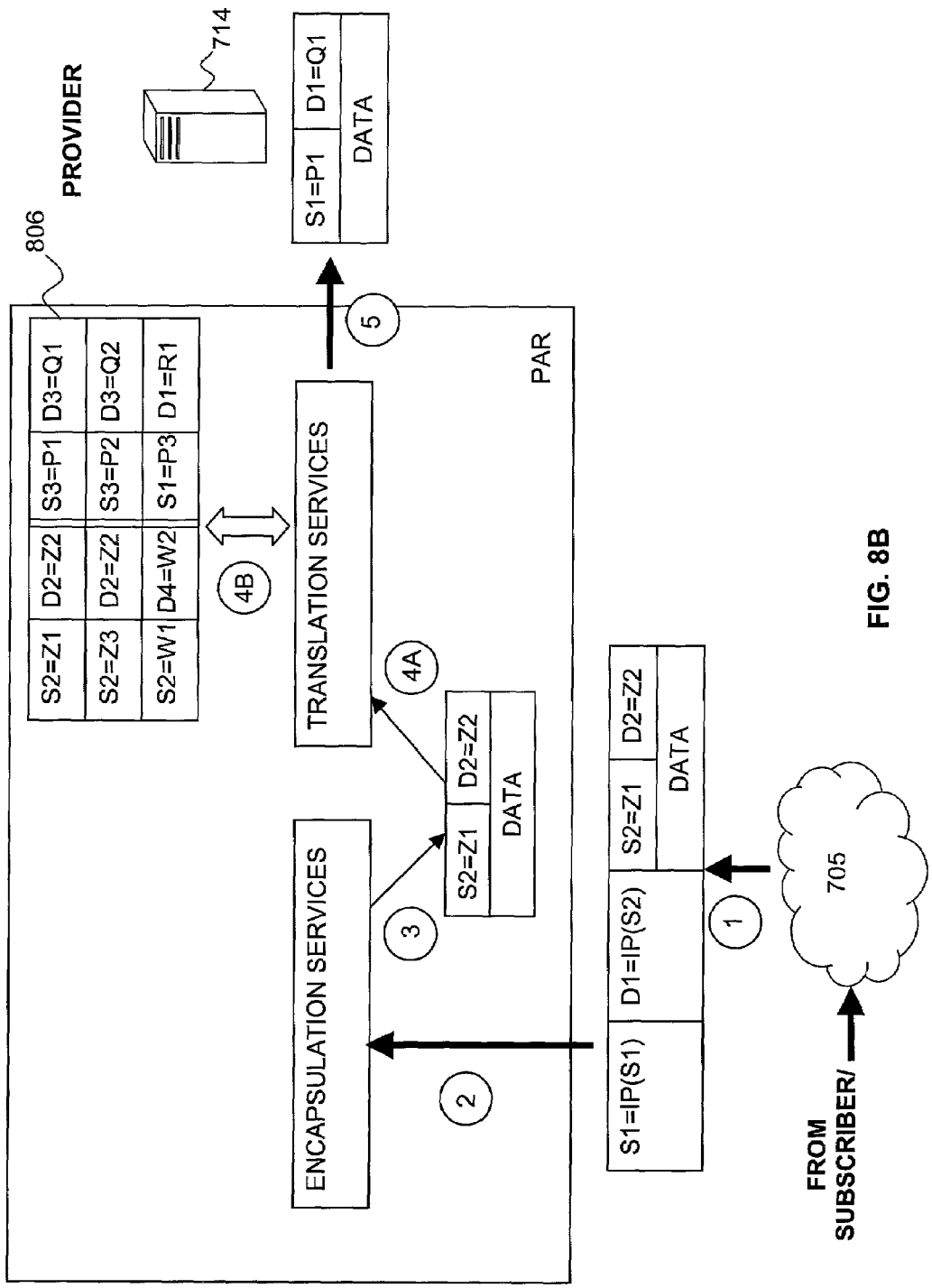

Referring now to FIG. 8A with continuing reference made to FIG. 7, the SAR (on network 701) is shown along with the path of a datagram traversing from Subscriber client 702, to the Provider's server hosting the requested application (after traversing the SAR, networking fabric 705, 701, and 715, and the PAR that is). To begin, it is assumed that Subscriber client 702 has selected (e.g., from a list) remote application "A" hosted by application server 714, which is coupled to the PAR on the Provider network. The datagram(s) sent from the client to access application "A" (i.e. signified as data) are created with the source address of X1 representing the Subscriber client 702 itself and a destination address of Y1 representing the local network address on the SAR. In one embodiment, this local address for the SAR is obtained by the client from DNS (e.g. DNS 706 or DNS 717).

Upon being transmitted to and received by the SAR, the translation services of the SAR perform a lookup in table 802 to identify a virtual address pair that represents a (possibly encrypted, depending on terms of the contract) tunnel associated with application "A" and provisioned between the SAR and the PAR. In one embodiment, all source addresses of client computers are translated many-to-one to the same virtual source address within the tunnel, and all destination addresses are translated many-to-one to the same destination address within the tunnel. This is done for applications that handle network address translation without modification. In another embodiment, all source addresses of client and server computers are translated one-to-one. For example, because Subscriber client 702 initiated the request to virtual server address Y1 in the illustrated embodiment, based upon the data in table 802 the virtual address pair selected is Z1 and Z2 representing VPN tunnel 712 in FIG. 7. However, if Subscriber client 704 had initiated the request to the same server Y1, table 802 would indicate a virtual address pair of Z3 and Z2 representing the same VPN tunnel. However, if Subscriber client 702 initiated the request to server 716 for application "B", the datagram would be sent, from address X1 to address Y2. The table 802 would, however, facilitate the translation of the source address to W1 and the destination address to W2, implying that the traffic should be sent through VPN 713 in FIG. 7.

In the case of the client 702 sending from X1 to Y1, once the appropriate virtual address pair has been identified, Z1 is substituted for X1 and Z2 is substituted for Y1 in the datagram header (2B). Because the virtual address pairs are not routable (i.e. they utilize RFC 1918 or selected reserved RFC 1166 address space), the datagram is encapsulated within a second routable datagram in order to be transported over networking fabric 705. The second datagram is a routable IP-based datagram. To encapsulate the first datagram having virtual address pairs, a lookup is performed in table 804 by the SAR (3B). The datagram is encapsulated with globally addressable (and therefore routable) source and destination addresses based upon the virtual address pairs present in the first datagram. Because the SAR encapsulates the virtually translated datagram within a globally-addressable second datagram, a wide variety of local addressing schemes and protocols may be utilized without negatively impacting the transparency of the data communications between the Subscriber network and the Provider. Once the datagram from Subscriber client 702 is encapsulated (4) the new datagram is delivered across networking fabric 705 towards the Provider as indicated by the destination address of the routable datagram. In one embodiment, the datagram is delivered across networking fabric 705 towards the Provider utilizing a pre-provisioned tunnel.

Referring now to FIG. 8B with continuing reference to FIG. 7, the PAR is shown along with the datagram of FIG. 8A received through networking fabric 705 from the SAR on Subscriber network 701 (1). Upon being received by the PAR, the encapsulation service of the present invention "unpackages" the original datagram resulting in the datagram having the unroutable virtual address pairs (3). At this point, the "unpackaged" datagram is passed to the translation services of the invention (4A), whereby a lookup is performed in table 806 to determine the final source/destination address pair that identifies the requested application (4B). For example, because the virtual source/destination address pair is Z1 & Z2 in the illustrated embodiment, the translation services of the present invention substitute the P1 for the local (virtual client) source address and Q1 for the local destination address, resulting in the datagram being passed to application server 714 hosting application "A" just as if the datagram had originated at a client directly connected to network 715. In one embodiment, address P1 and Q1 are on the same subnet. Thus, it can be seen that with the transport services of the present invention, a datagram may be transparently delivered across networks employing a variety of addressing schemes without the need for inconvenient and time consuming manual configurations.

Tunnel Allocation

When a SAR has selected a PAR that it wishes to communicate with, it will create the tunnel based on parameters in the Contract as well as dynamically negotiated parameters. In one embodiment, the following parameters are determined: shared secret for the tunnel, IP subnet address within the tunnel, Virtual IP address of the client on the PAR, virtual IP address of the server on the SAR, encryption level, compression level, bandwidth throttling, monitored application ports, statefully monitored application ports, and the PAR's public IP address. In one embodiment, the PAR creates a tunnel process that listens for a connection from the SAR. When the SAR connects, the PAR sends an acknowledgement, and the PAR and the SAR then bind the tunnel parameters to a fully established tunnel.

In one embodiment, the virtual IP address of the Server on the SAR will be allocated from either a DHCP server on the Subscriber's network or from a pre-configured list that has been entered into the SAR. When the SAR has selected an IP address that will be used for the purpose of fulfilling this contract, that IP address will be transmitted to the PAR. The PAR will then publish that IP address to its local DNS process under the name of the contract ID. As the Provider references the PAR's DNS services as an authoritative subdomain, the DNS name for that contract will return the IP address of the SAR's allocated IP address for that contract. For example, if the provider is authoritative for the DNS domain "provider.com", and has designated a PAR as authoritative for "apps.provider.com", then the name "contractID.apps.provider.com" will resolve to the IP address that a SAR has allocated on the Subscriber's network.

Subscriber End User Allocation

There are two aspects of Allocation. One is the ability for the present invention to restrict access to an application server through the network to only Subscriber end users that have been given rights to an application. The other, is the ability to determine the list of Subscriber End users that have been granted access to the server through the network and to make that list available to the Provider. The present invention uses two facilities to determine access for a given Subscriber End User: a Rulebase and an authentication authority. The Rulebase represents an internal list of rules that specify what user or group has access to what application under what circumstances. The authentication authority, however, is an external service that is maintained by the Subscriber and/or the Provider and allows the invention to determine (1) whether a given username and password are authentic and (2) what users are contained within a group.

Figure 6:
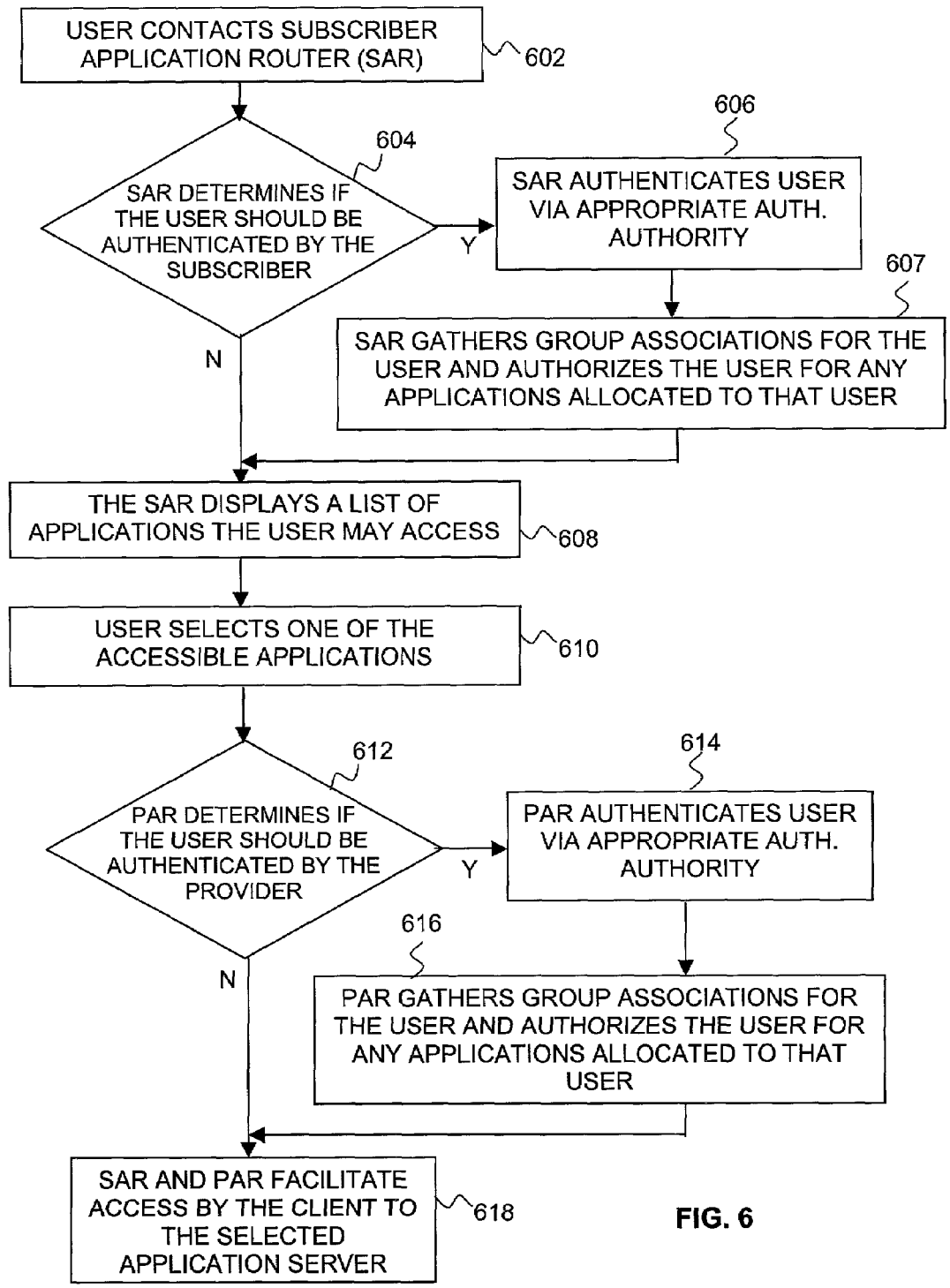
FIG. 6 is an operational flow diagram illustrating aspects of the Subscriber End User authentication process of the present invention, in accordance with one embodiment.

FIG. 6 is an operational flow diagram illustrating aspects of the Subscriber End User authentication process of the present invention, in accordance with one embodiment. Referring now back to FIG. 6, a client establishes a data connection with a SAR logically disposed within the same Subscriber network as the client, block 602. A Subscriber End User of the client may initiate such contact with a SAR by selecting an icon displayed within a window or browser application executing upon the client, for example. In the "Active Subscriber" embodiment, if the Subscriber IT administrator has determined that authentication is necessary, the SAR requests a username and password from the Subscriber End User, block 604. Once obtained, the authentication credentials are validated against the Subscribers authentication authority, such as an LDAP-compliant database, block 606. Once it is determined that the user has provided valid login credentials, the Rulebase is consulted to determine all applications for which the user has been authorized by e.g. the Subscriber IT Administrator.

Once the membership criteria is determined, the SAR notifies the authenticated Subscriber End user as to which such applications that user may access, block 608. That authenticated user may receive a graphical and/or alphanumeric notification depending upon the particular client implementation. At block 610, the authenticated Subscriber End user then selects one of the applications determined to be accessible.

Independent of whether the Subscriber IT Administrator (if one exists) has chosen to authenticate and authorize the Provider's applications to its users, the Provider may choose to authenticate the Subscriber End Users itself, block 612. For example, the SAR may have determined that a given Subscriber End User is allowed access to an application, but that user may be challenged (possibly again, if the SAR has already authenticated them) by the PAR if there are any applications that the Provider has specified as needing authentication. In one embodiment, the PAR will challenge any user that seeks to access an application that the PAR has designated as requiring authentication, block 614. This is achieved in the same manner as on the Subscriber side, except that the Provider will challenge the Subscriber End User after they have received their list of applications and chooses to run one.

Determining a list of authorized Subscriber End Users is achieved through gathering user and group information from the authentication authority to determine all the users that are authorized by the Subscriber IT administrator to each of the Provider's applications, block 616. Independent of the login/authentication/authorization process, the SAR will periodically query the authentication authority against the local rulebase to determine a complete list of Subscriber end users that are authorized for each of the Provider's applications. The list of authorized users is then made available to the Provider Administrators, e.g. the administrator of the application and/or the authenticated client. In one embodiment, the list is made available via email, whereas in another embodiment the list is made available via an administration interface on the PAR(s).

The SAR then facilitates access (e.g. through Transport, described above) between their client and the selected Provider application, such as Applications "A" or "B", in response to such a selection by the Subscriber End User (block 618).

Exemplary Application Router

Figure 9:
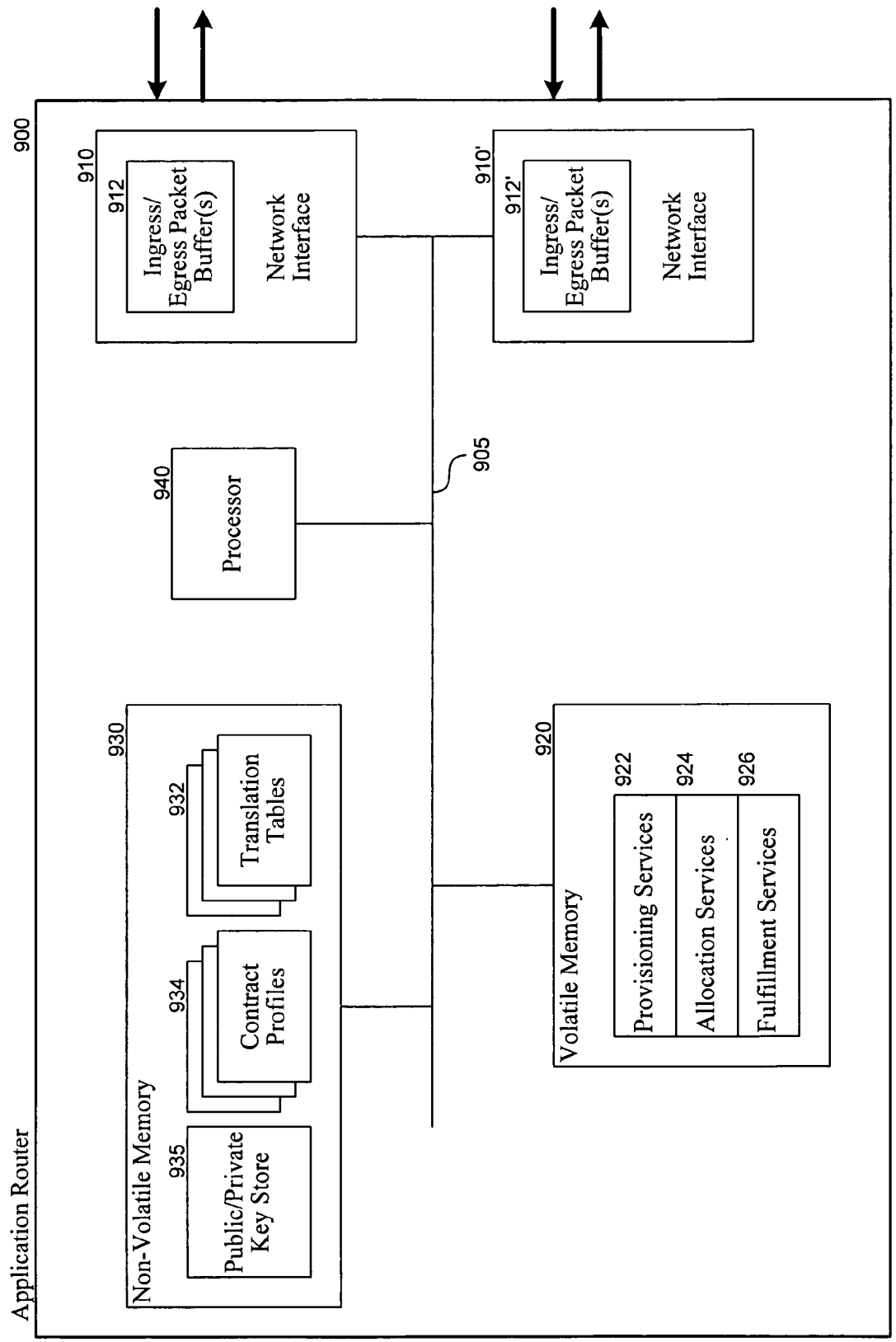
FIG. 9 is a block diagram illustrating one embodiment of an application router of the present invention.

FIG. 9 is a block diagram illustrating one embodiment of an application router of the present invention. Application router 900 includes network interfaces 910 and 910', processor 940, non-volatile memory 930 including network address translation tables 932 and contract profiles 934, and volatile memory 920 including the various services of the present invention, coupled together by way of bus 905. Network interfaces 910 and 910' include one or more ingress-egress packet buffers 912/912'.

Processor 940 represents one or more general purpose processors to execute instructions to cause application router 900 to process data packets in accordance with the teachings of the present invention. In other embodiments, processor 940 may instead represent one or more special purpose processors or application specific integrated circuits (ASICS). Volatile memory 920 represents any of the various readily available dynamic random access memory devices, whereas non-volatile memory 930 represents any of the various readily available static random access memory devices. In accordance with the teachings of the present invention, volatile memory 920 includes Provisioning services 922, Allocation services 924, and Fulfillment services 926, as described herein above. Furthermore non-volatile memory 930 is shown to have contract profiles 934 and public/private key pairs for itself and public keys for any authorized PARs and SARs that this application router may communicate with (935).

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:
providing first one or more application service contracts by a first application service provider (Provider) to a community of one or more subscriber application routers (SAR), said first one or more application service contracts specifying subscriptions to first one or more application services provided by first one or more servers of said first Provider, said first one or more application service contracts are provided by a community of one or more provider application routers (PARs);
automatically provisioning first one or more application delivery transports to facilitate delivery of said first one or more application services provided by said first one or more servers of said first Provider to clients of said Subscriber in accordance with said first one or more application service contracts, wherein said automatically provisioning first one or more application delivery transports comprises identifying, by a first SAR of said community of one or more SARs, a preferred PAR of said community of one or more PARs, and negotiating a subnet between said first SAR and said preferred PAR;

providing second one or more application service contracts by a second application service provider (Provider) to the community of one or more subscriber application routers (SAR), said second one or more application service contracts specifying subscriptions to second one or more application services provided by second one or more servers of said second Provider;

automatically provisioning second one or more application delivery transports to facilitate delivery of said second one or more application services provided by said second one or more servers of said second Provider to clients of said Subscriber in accordance with said second one or more application service contracts; and delivering selected ones of said first and second application services provided by said first and second one or more servers of said first and second Providers through selected ones of said first and second application delivery transports respectively.

2. The method of claim 1, wherein said second one or more application service contracts are provided by a second community of one or more PARs.

3. The method of claim 1, wherein said automatically provisioning first one or more application delivery transports further comprises:
negotiating a shared secret between said first SAR and said preferred PAR to facilitate provisioning of said first one or more delivery transports.

4. The method of claim 1, wherein said providing first one or more application service contracts to a community of one or more SAR(s) comprises providing one or more unapproved service contracts to a community of one or more SAR(s) for approval by the SAR(s).

5. The method of claim 4, wherein said community of one or more SAR(s) approves said one or more unapproved service contracts through manifestation of a digital signature by the approving SAR(s).

6. The method of claim 1, wherein at least one of said first one or more application delivery transports and said second one or more application delivery transports comprise one or more virtual private network tunnels.

7. In a subscriber application routing device (SAR), a method comprising:
receiving first one or more application service contracts from a first application service provider (Provider), said first one or more application service contracts specifying subscriptions to first one or more application services provided by first one or more servers of said first Provider, said first one or more application service contracts are provided by a community of one or more provider application routers (PARs);

automatically provisioning first one or more application delivery transports to facilitate delivery of said first one or more application services provided by said first one or more servers of said first Provider to clients of said Subscriber in accordance with said first one or more application service contracts, wherein said automatically provisioning first one or more application delivery transports comprises identifying a preferred PAR of said community of one or more PARs, and negotiating a subnet between said SAR and said preferred PAR;

receiving second one or more application service contracts from a second application service provider (Provider), said second one or more application service contracts specifying subscriptions to second one or more application services provided by second one or more servers of said second provider;

automatically provisioning second one or more application delivery transports to facilitate delivery of said second one or more application services provided by said second one or more servers of said second Provider to clients of said Subscriber in accordance with said second one or more application service contracts; and receiving selected ones of said first and second application services provided by said first and second one or more servers of said first and second Providers through selected ones of said first and second application delivery transports.

8. The method of claim 7, wherein said SAR solicits said first one or more application service contracts from said first provider.

9. The method of claim 7, wherein said first one or more application service contracts are received from said first provider through an encrypted control channel.

10. The method of claim 7, further comprising:
approving at least a subset of said first one or more application service contracts received from said first provider, and
transmitting said approved one or more application service contracts back to said first provider.

11. The method of claim 7, wherein said automatically provisioning said first one or more application delivery transports comprises automatically provisioning a first one or more virtual private network tunnels between said SAR and said first provider.

12. A subscriber application routing device (SAR) comprising:
a storage medium having stored therein a plurality of programming instructions, which when executed cause the SAR to
receive first one or more application service contracts from a first application service provider (Provider), said first one or more application service contracts specifying subscriptions to first one or more application services provided by first one or more servers of said first Provider, said first one or more application service contracts are provided by a community of one or more provider application routers (PARs);

automatically provision first one or more application delivery transports to facilitate delivery of said first one or more application services provided by said first one or more servers of said first Provider to clients of said Subscriber in accordance with said first one or more application service contracts, wherein said automatically provisioning first one or more application delivery transports comprises identifying a preferred PAR of said community of one or more PARs, and negotiating a subnet between said SAR and said preferred PAR;

receive second one or more application service contracts from a second application service provider (Provider), said second one or more application service contracts specifying subscriptions to second one or more application services provided by second one or more servers of said second provider, automatically provision second one or more application delivery transports to facilitate delivery of said second one or more application services provided by said second one or more servers of said second Provider to clients of said Subscriber in accordance with said second one or more application service contracts, and receive selected ones of said first and second application services provided by said first and second one or more servers of said first and second Providers through selected ones of said first and second application delivery transports; and an execution unit coupled to the storage medium for executing the plurality of programming instructions.

13. The SAR of claim 12, wherein said SAR solicits said first one or more application service contracts from said first provider.

14. The SAR of claim 12, wherein said first one or more application service contracts are received from said first provider through an encrypted control channel.

15. The SAR of claim 12, further comprising instructions to
approve at least a subset of said first one or more application service contracts received from said first provider, and
transmit said approved one or more application service contracts back to said first provider.

16. The SAR of claim 12, wherein said instructions to automatically provision said first one or more application delivery transports further comprises instructions to automatically provision a first one or more virtual private network tunnels between said SAR and said first provider.

17. In a subscriber application routing device (SAR), a method comprising:
receiving one or more application service contracts from an application service provider (Provider), said one or more application service contracts specifying subscriptions to one or more application services provided by one or more servers of said Provider;
requesting from the Provider a list of provider application routers (PARs) identified as being able to support a given contract of said one or more application service contracts;
automatically provisioning one or more application delivery transports between said SAR and a selected one or more of said listed PARs to facilitate delivery of said one or more application services provided by said one or more servers of said Provider to clients of said Subscriber in accordance with said one or more application service contracts, wherein said automatically provisioning one or more application delivery transports comprises negotiating a subnet between said SAR and said selected one or more of said listed PARs; and
receiving selected ones of said application services provided by said one or more servers of said Provider through selected ones of said application delivery transports respectively.

18. The method of claim 17, wherein said selected one or more of said listed PARs are selected by the SAR based at least in part upon response times of the respective PARs.

19. The method of claim 17, wherein automatically provisioning one or more application delivery transports comprises establishing one or more virtual private network tunnels between said SAR and said selected one or more PARs.

20. A subscriber application routing device (SAR) comprising:
a storage medium having stored therein a plurality of programming instructions, which when executed cause the SAR to
receive one or more application service contracts from an application service provider (Provider), said one or more application service contracts specifying subscriptions to one or more application services provided by one or more servers of said Provider,
request from the Provider a list of provider application routers (PARs) able to support a given contract of said one or more application service contracts, wherein said automatically provisioning one or more application delivery transports comprises negotiating a subnet between said SAR and said selected one or more of said listed PARs;
automatically provision one or more application delivery transports between said SAR and a selected one or more of said listed PARs to facilitate delivery of said one or more application services provided by said one or more servers of said Provider to clients of said Subscriber in accordance with said one or more application service contracts,
receive selected ones of said application services provided by said one or more servers of said Provider through selected ones of said application delivery transports respectively; and
an execution unit coupled to the storage medium for executing the plurality of programming instructions.

21. The apparatus of claim 20, wherein said selected one or more of said listed PARs are selected by the SAR based at least in part upon relative response times of the respective PARs.

22. The apparatus of claim 20, wherein said instructions for automatically provisioning one or more application delivery transports further comprises instructions for establishing one or more virtual private network tunnels between said SAR and said selected one or more PARs.

23. In a provider application routing device (PAR), a method comprising:
providing first one or more application service contracts to a first community of one or more subscriber application routers (SAR), said first one or more application service contracts specifying subscriptions to first one or more application services provided by first one or more servers of said Provider;
providing second one or more application service contracts to a second community of one or more subscriber application routers (SAR), said second one or more application service contracts specifying subscriptions to second one or more application services provided by second one or more servers of said Provider; and
delivering selected ones of said first and second application services provided by said first and second one or more servers of said Provider through selected ones of a first one or more application delivery transports provisioned between said first community of one or more SARs and said PAR and a second one or more application delivery transports provisioned between said second community of one or more SARs and said PAR, wherein said selected ones of said first one or more application delivery transports are provisioned by negotiating a subnet between said first community of one or more SARs and said PAR, and further wherein said selected ones or said second one or more application delivery transports are provisioned by negotiating a subnet between said second community of one or more SARs and said PAR.

24. The method of claim 23, wherein the selected ones of said first and second application services are delivered to one or more clients of said first community of one or more SARs.

25. The method of claim 23, wherein said PAR is one of a community of PARs.

26. The method of claim 25, further comprising:

identifying which PAR(s) amongst the community of PARs are able to support a selected one of said first one or more application service contracts; and notifying said first community of one or more SARs as to which PARs are able to support the selected one of said first one or more application service contracts.

27. The method of claim 23, wherein said first one or more application delivery transports comprise first one or more virtual private network tunnels.

28. A provider application routing device (PAR) comprising:

a storage medium having stored therein a plurality of programming instructions, which when executed cause the PAR to provide first one or more application service contracts to a first community of one or more subscriber application routers (SAR), said first one or more application service contracts specifying subscriptions to first one or more application services provided by first one or more servers of said Provider, provide second one or more application service contracts to a second community of one or more subscriber application routers (SAR), said second one or more application service contracts specifying subscriptions to second one or more application services provided by second one or more servers of said Provider, and deliver selected ones of said first and second application services provided by said first and second one or more servers of said Provider through selected ones of a first one or more application delivery transports provisioned by said first community of one or more SARs and a second one or more application delivery transports provisioned by said second community of one or more SARs, wherein said selected ones of said first one or more application delivery transports are provisioned by negotiating a subnet between said first community of one or more SARs and said PAR, and further wherein said selected ones or said second one or more application delivery transports are provisioned by negotiating a subnet between said second community of one or more SARs and said PAR; and an execution unit coupled to the storage medium for executing the plurality of programming instructions.

29. The PAR of claim 28, wherein the selected ones of said first and second application services are delivered to one or more clients of said first community of one or more SARs.

30. The PAR of claim 28, wherein said PAR is one of a community of PARs.

31. The PAR of claim 30, further comprising instructions to:

identify which PAR(s) amongst the community of PARs are able to support a selected one of said first one or more application service contracts; and notify said first community of one or more SARs as to which PARs are able to support the selected one of said first one or more application service contracts.

32. The PAR of claim 28, wherein said first one or more application delivery transports comprise first one or more virtual private network tunnels.

33. In a provider application routing device (PAR), a method comprising:

providing first one or more application service contracts to a community of one or more subscriber application routers (SAR), said first one or more application service contracts specifying subscriptions to first one or more application services provided by first one or more servers of said Provider; and delivering selected first ones of said one or more application services provided by said first one or more servers of said Provider through a selected one or more application delivery transports provisioned by said community of one or more SARs, wherein said selected one or more application delivery transports are provisioned by negotiating a subnet between said community of one or more SARs and said PAR.

34. A provider application routing device (PAR) comprising:

a storage medium having stored therein a plurality of programming instructions, which when executed cause the PAR to provide first one or more application service contracts to a community of one or more subscriber application routers (SAR), said first one or more application service contracts specifying subscriptions to first one or more application services provided by first one or more servers of said Provider, deliver selected ones of said first one or more application services provided by said first one or more servers of said Provider through a selected one or more application delivery transports provisioned by said community of one or more SARs, wherein said selected one or more application delivery transports are provisioned by negotiating a subnet between said community of one or more SARs and said PAR; and an execution unit coupled to the storage medium for executing the plurality of programming instructions.

* * * * *